(12) United States Patent
Hubert et al.

(10) Patent No.: US 9,127,704 B2
(45) Date of Patent: Sep. 8, 2015

(54) TORNADO PROTECTION SYSTEM AND RELATED METHODS

(71) Applicants: Rolf Hubert, Pelham, NH (US); Albin Hastbacka, West Chatham, MA (US)

(72) Inventors: Rolf Hubert, Pelham, NH (US); Albin Hastbacka, West Chatham, MA (US)

( * ) Notice: Subject to any disclaimer, the term of this patent is extended or adjusted under 35 U.S.C. 154(b) by 0 days.

(21) Appl. No.: 14/340,019

(22) Filed: Jul. 24, 2014

(65) Prior Publication Data

US 2015/0053839 A1    Feb. 26, 2015

Related U.S. Application Data

(60) Provisional application No. 61/959,391, filed on Aug. 22, 2013.

(51) Int. Cl.
- *A47B 97/00* (2006.01)
- *F16B 13/00* (2006.01)
- *E04H 9/14* (2006.01)
- *E04H 6/42* (2006.01)

(52) U.S. Cl.
CPC . *F16B 13/00* (2013.01); *E04H 6/42* (2013.01); *E04H 9/14* (2013.01)

(58) Field of Classification Search
CPC ......... F16G 11/00; F16G 11/12; F16B 13/00; E04H 9/14; E04H 6/42
See application file for complete search history.

(56) References Cited

U.S. PATENT DOCUMENTS

| | | | |
|---|---|---|---|
| 3,908,961 A * | 9/1975 | Hicks | 410/23 |
| 4,070,834 A * | 1/1978 | Jameson | 52/166 |
| 4,568,103 A * | 2/1986 | Celentino | 280/765.1 |
| 5,908,274 A * | 6/1999 | Silberman | 410/10 |
| 5,941,665 A * | 8/1999 | Dahlin | 410/20 |
| 2006/0201070 A1* | 9/2006 | Nale et al. | 52/23 |
| 2007/0189873 A1* | 8/2007 | Breeden | 410/100 |

\* cited by examiner

*Primary Examiner* — Amy Sterling
(74) *Attorney, Agent, or Firm* — Hayes Soloway PC

(57) ABSTRACT

A tornado protection system and related methods are provided. The tornado protection system includes a concrete pad. At least two anchors are affixed to the concrete pad. A vehicle is in a grounded position on the concrete pad. At least two anchor straps are connected between the vehicle and the at least two anchors, respectively, wherein the at least two anchor straps are connected to at least two sides of the vehicle, respectively. The tornado protection system may allow the vehicle to remain grounded throughout the duration of a tornado having a wind speed of at least 65 MPH, a horizontal wind force of at least 2,959 lbs., and a vector wind force of at least 4,638 lbs.

12 Claims, 9 Drawing Sheets

TORNADO PROTECTION SYSTEM AND RELATED METHODS

CROSS REFERENCE TO RELATED APPLICATION

This application claims benefit of U.S. Provisional Application Ser. No. 61/959,391 entitled, "Transportable tornado protection system" filed Aug. 22, 2013, the entire disclosure of which is incorporated herein by reference.

FIELD OF THE DISCLOSURE

The present disclosure is generally related to protection systems and more particularly is related to tornado protection system and related methods.

BACKGROUND OF THE DISCLOSURE

A tornado is a violently rotating column of air that is in contact with both the surface of the earth and a cloud. Tornadoes come in many shapes and sizes, but they are typically in the form of a visible condensation funnel, whose narrow end touches the earth and is often encircled by a cloud of debris and dust. Tornadoes are traditionally rated on the Fujita scale or, more recently, the Enhanced Fujita (EF) scale. In accordance with the EF scale, tornadoes are rated as follows:

| Rating | Wind Speed (MPH) | Typical Damage To A Structure |
| --- | --- | --- |
| EF-0 | 65-85 | Little substantial damage, e.g., maybe a few shingles from the roof |
| EF-1 | 86-110 | Far more damage than EF-O, e.g., more roof shingles will be removed |
| EF-2 | 111-135 | Substantial damage, e.g., entire roofs will be removed, and the structure may even be moved slightly |
| EF-3 | 136-165 | Significant damage, e.g., entire roofs will be removed as well as exterior walls will cave inward |
| EF-4 | 166-200 | Extensive damage, e.g., interior walls will cave inward including those of closets and bathrooms |
| EF-5 | Over 200 | Complete devastation, e.g., the entire structure is destroyed and removed with only the slab being left |

Tornado protection devices are conventionally available and they often provide a level of physical protection from the effects of a tornado. For example, some tornado protection devices include a 'safe room' or equivalent space within a house such as in a dedicated protected area of a building, or more likely, buried below ground. While these conventional devices and systems are able to provide a high level of protection, they are very expensive, often costing several thousand to tens of thousands of dollars. As a result, this price range acts to exclude a vast majority of people who could benefit from tornado protection devices.

In addition to the expense, other drawbacks of conventional devices are that they are cumbersome, they require installation in fixed locations and cannot be moved as a user might desire, and they often occupy space that could be used for other purposes. An example of a conventional tornado protection device includes a work bench tornado safe room, which provides a work-bench structure that users can climb into for protection during a tornado. Another example is a security vault device that includes components that can be transported to a construction site. This vault, however, requires the assembly of permanently affixing the components together to form a non-transportable system. Other types of ground shelters have also been proposed, where the shelters are located below a ground surface, thus making them impractical for simple transportability.

Thus, a heretofore unaddressed need exists in the industry to address the aforementioned deficiencies and inadequacies.

SUMMARY OF THE DISCLOSURE

Embodiments of the present disclosure provide a system and method for a tornado protection system. Briefly described, in architecture, one embodiment of the system, among others, can be implemented as follows. At least two anchors are affixed to a concrete pad. A vehicle is in a grounded position on the concrete pad. At least two anchor straps are connected between the vehicle and the at least two anchors, respectively, wherein the at least two anchor straps are connected to at least two sides of the vehicle, respectively.

The present disclosure can also be viewed as providing a tornado protection system providing an anchored vehicular shelter. Briefly described, in architecture, one embodiment of the system, among others, can be implemented as follows. A garage has a concrete pad. At least two anchors are affixed to the concrete pad. A vehicle is in a grounded position on the concrete pad. At least two anchor straps are connected between the vehicle and the at least two anchors, respectively, wherein the at least two anchor straps are connected to at least two sides of the vehicle, respectively. An external wind force is applied to at least one of the garage and the vehicle, the external wind force having a horizontal force greater than 2,959 lbs., wherein the at least two anchor straps retain the vehicle in a substantially stationary position on the concrete pad throughout a duration of the external wind force.

The present disclosure can also be viewed as providing methods of anchoring a vehicular shelter during a tornado. In this regard, one embodiment of such a method, among others, can be broadly summarized by the following steps: providing a vehicle in a grounded position on a concrete pad; connecting at least two anchor straps between at least two sides of the vehicle and the at least two anchors, respectively, wherein the at least two anchors are affixed to the concrete pad; and retaining the vehicle in the grounded position on the concrete pad using the at least two anchor straps and the at least two anchors throughout a duration of a tornado, wherein a wind force of the tornado is above 65 MPH.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
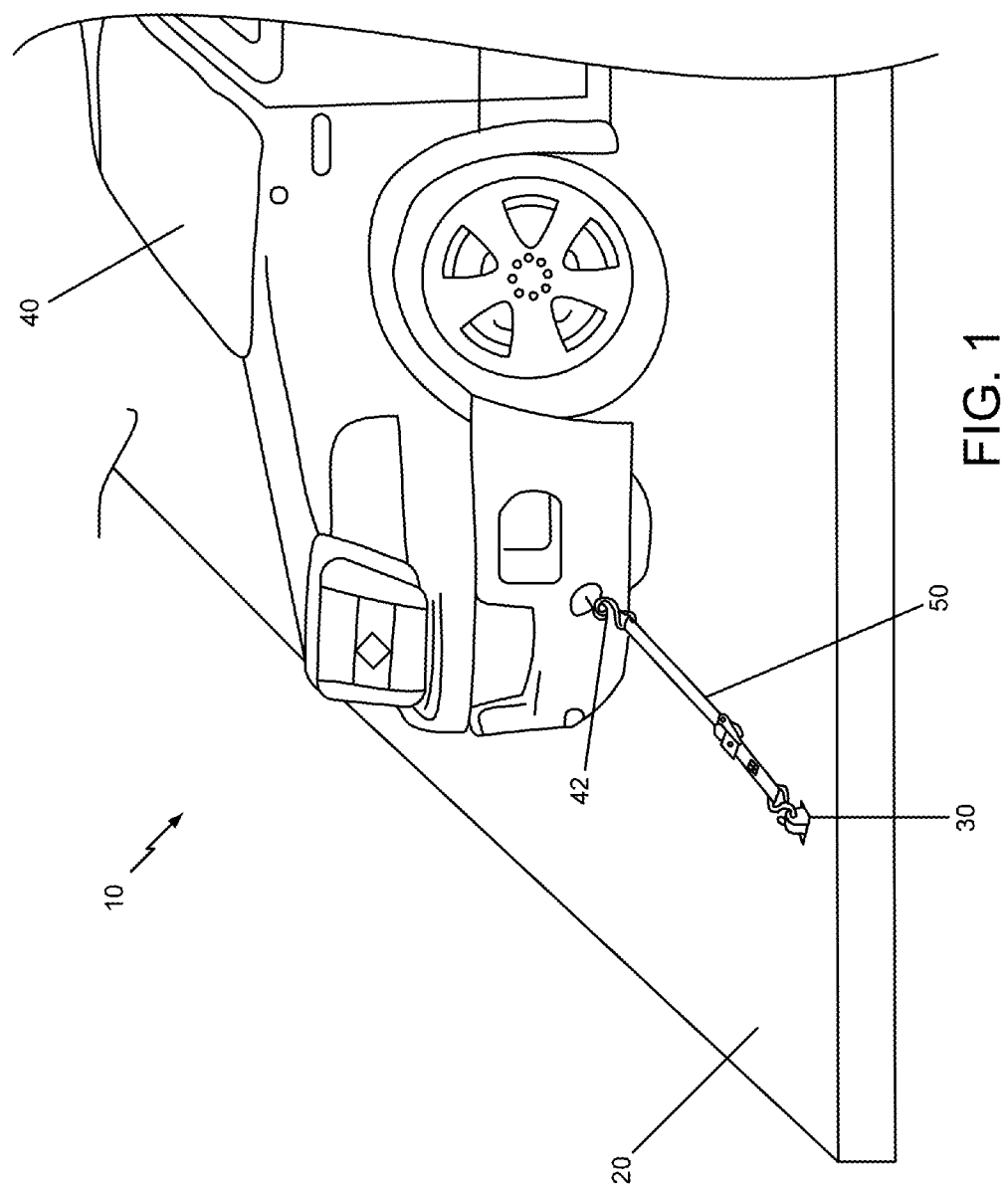
FIG. 1 is a plan view illustration of tornado protection system, in accordance with a first exemplary embodiment of the present disclosure.

FIG. 1 is a plan view illustration of tornado protection system 10, in accordance with a first exemplary embodiment of the present disclosure. The tornado protection system 10, which may be referred to herein as 'system 10' includes a concrete pad 20. At least two anchors 30 (only one is shown in FIG. 1) are affixed to the concrete pad 20. A vehicle 40 is in a grounded position on the concrete pad 20. At least two anchor straps 50 are connected between the vehicle 40 and the at least two anchors 30, respectively, wherein the at least two anchor straps 50 are connected to at least two sides of the vehicle 40, respectively.

The system 10 may provide significant benefits in providing protection during tornados which is convenient for users of the system and affordable for most residents of tornado-prone locations. Most important of all, the system 10 may provide reliable protection for living beings during harsh tornado conditions. For example, the system 10 may provide physical protection for people and pets from the damages inflicted by a tornado or other significant windstorms, when a safe room, underground locations, or an equivalent setting is not readily available. As is detailed herein, the system 10 takes advantage of the qualities of a motor vehicle, for example, the weight and the existing safety features, as well as the high availability and presence of the motor vehicle in most tornado-prone locations.

The system 10 includes a concrete pad 20 which may be a stand-alone concrete pad, a portion of a foundation of a building, such as a garage, or another concrete platform or structure sufficiently large enough to withstand tornado conditions. In most cases, the concrete pad 20 can be the existing concrete of a garage. The concrete pad 20 may include any type of cement or concrete materials and may have any size. However, the concrete pad 20 must be formed as a unitary structure that will prevent breaking during a tornado. For example, asphalt or similar particulate-based materials may appear unitary but are actually highly susceptible to being broken apart in high winds. As a result, asphalt or other particulate-based materials are not suitable for securing the anchors 30 therein. It is preferable for the concrete pad 20 to be at least four inches thick such that it provides a proper level of anchoring material for the anchors 30. As an example, a successful concrete pad 20 may have a weight of approximately 10,000 pounds or more which may equate to an area of at least 200 sq ft. Since most vehicles 40, when parked in a garage, are on a concrete pad 20 of dimensions 10 feet by 20 feet, the typical weight of a four inch thick pad with an area of 200 square feet will weigh 10,000 pounds, which is adequate to hold the vehicle 40 in place during a storm event.

Any number of anchors 30 may be affixed to or within the concrete pad 20, but it is preferable to include at least two anchors 30, and more preferable to include at least four anchors 30. The anchors 30 may generally include an anchor base and a threaded anchor fixture, whereby the anchor base is forced into the concrete pad 20 and retained permanently therein. For example, the anchor base may be driven into a hole drilled within the concrete pad 30 and retained within the hole using a wedge or prong structure which prevents removal of the anchor base. In other examples, the anchor base may be affixed to the concrete pad 20 at the time the concrete pad 20 is poured. The anchor base may have a threaded connector for receiving the anchor fixture. Further details about the anchors 30 are provided relative to FIG. 2. Regardless of the type of anchor 30 utilized with the system 10, the anchor 30 must provide a secure point at which to attach the anchor straps 50 to.

The motor vehicle 40, or simply vehicle, is positioned in a grounded position on the concrete pad 20, i.e., with its tires in contact with the top surface of the concrete pad 20. The vehicle 40 may include any motor vehicle that is built on a sturdy body-on-frame or a unibody, and is preferably a truck, a sport utility vehicle (SUV), or another vehicle that is durably constructed and has significant weight. Vehicles 40 fitting these requirements are plentiful in most tornado-prone locations, such as the mid-west states of the United States.

With a vehicle 40 that has a body-on-frame, various parts of the frame may be accessible for connecting the anchor traps 50 to. For example, as is shown in FIG. 1, tow rings 42 may be provided at the front or the rear of the vehicle. Other sturdy structures, such as tow hitches and the frame rail, may also be accessible. It may be preferable to affix the anchor straps 50 to points on the frame and/or body of the vehicle 40 that are durable enough to resist deformation or failure when tornado conditions are present. For example, portions of the vehicle 40 that are intended for towing the vehicle are preferable. In some situations, such as with a unibody vehicle construction, it may be difficult to find a durable point on the vehicle 40 on which to attach the anchor straps 50. When this situation occurs, it may be possible to connect the anchor straps 50 to the wheels of the vehicle 40, as is described relative to FIG. 7.

Regardless of what structure of the vehicle 40 the anchor straps 50 are affixed to, it is necessary for the anchor straps 50 to be connected to at least two sides of the vehicle 40. The two sides may commonly be opposing sides of the vehicle 40, such as a front and rear of the vehicle 40. While it is necessary for the vehicle 40 to be secured from at least two sides, but it is possible for multiple anchor straps 50 may be used together on a single side of the vehicle 40.

The anchor straps 50 may include a variety of strapping and securing material. For example, preferably the anchor straps 50 include fabric-based or woven straps which have hooks on either end and may include a ratcheting or tensioning device in the middle. Other materials for the anchor straps 50 may include rope, metal cable, and metal chain, or other highly durable materials capable of securing a vehicle 40 in place. In another example, the strap portion of the anchor straps 50 may be constructed from non-metallic materials, such as polypropylene, nylon, polyester, aramid (Kevlar, Twaron, Technora), or high density polyethylene (HDPE), among others. The anchor straps 50 may have weight ratings sufficient for withstanding the forces from a tornado. For example, the anchor straps 50 may have a rating of a breaking strength of at least 10,000 pounds, which can be achieved, for example, with polyester straps of 2 inch width.

Figure 2:
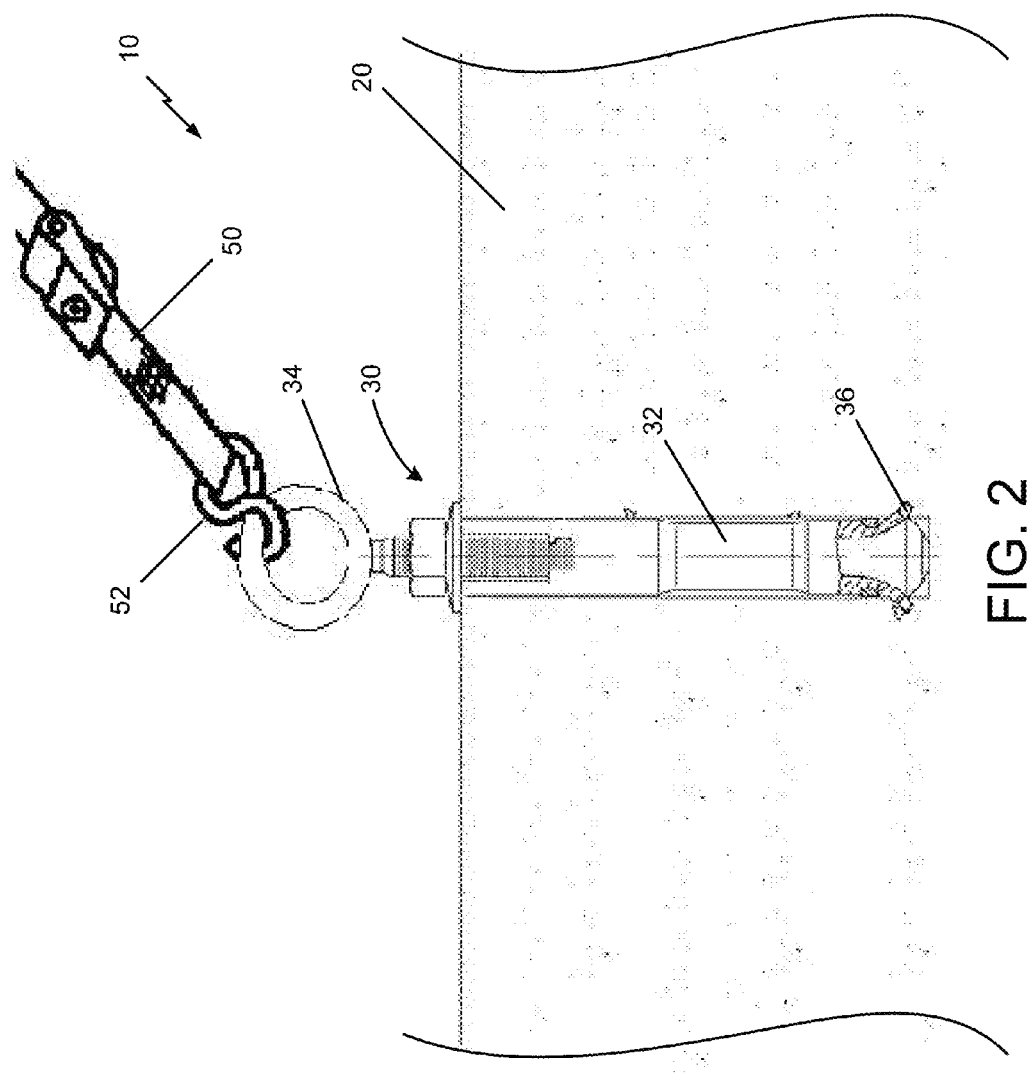
FIG. 2 is a partial cross-section side view illustration of an anchor of the tornado protection system, in accordance with the first exemplary embodiment of the present disclosure.

FIG. 2 is a partial cross-section side view illustration of an anchor 30 of the tornado protection system 10, in accordance with the first exemplary embodiment of the present disclosure. The anchor 30 depicted in FIG. 2 includes an anchor base 32 that is biased into the concrete pad 20 and an anchor fixture 34 removably connected to the anchor base 32. The anchor base 32 may be positioned within a hole within the concrete pad 20 and flared points or wedges 36 may be driven outwards into the hole sidewalls, thereby securing the anchor base 32 within the concrete pad 20 permanently. The anchor 30 may have a pull-out or failure rating which is sufficient to retain the anchor 30 within the concrete pad 20 during a tornado, and further, is sufficient for anchoring the anchor straps 50 and vehicle 40 in a grounded position on the concrete pad 20. For example, the pull-out rating of the anchor 30 may be greater than 8,900 lbs., which may be provided by certain ¾ inch diameter anchors 30.

The anchor fixture 34 may be threadedly connected to the anchor base 32, or otherwise removably connected thereto, such that the anchor fixture 34 is fully retained by the anchor base 32 to the concrete pad 20. The anchor fixture 34 may include a ring, hook, or other structure which facilitates engagement with the hook 52 of the anchor strap 50. It is envisioned that the anchor fixture 34 may include a variety of different designs to facilitate engagement with the hook 52, all of which are considered within the scope of the present disclosure. Further, the anchor fixture 34 may be positioned a variety of heights relative to a top surface of the concrete pad 20.

Figure 3:
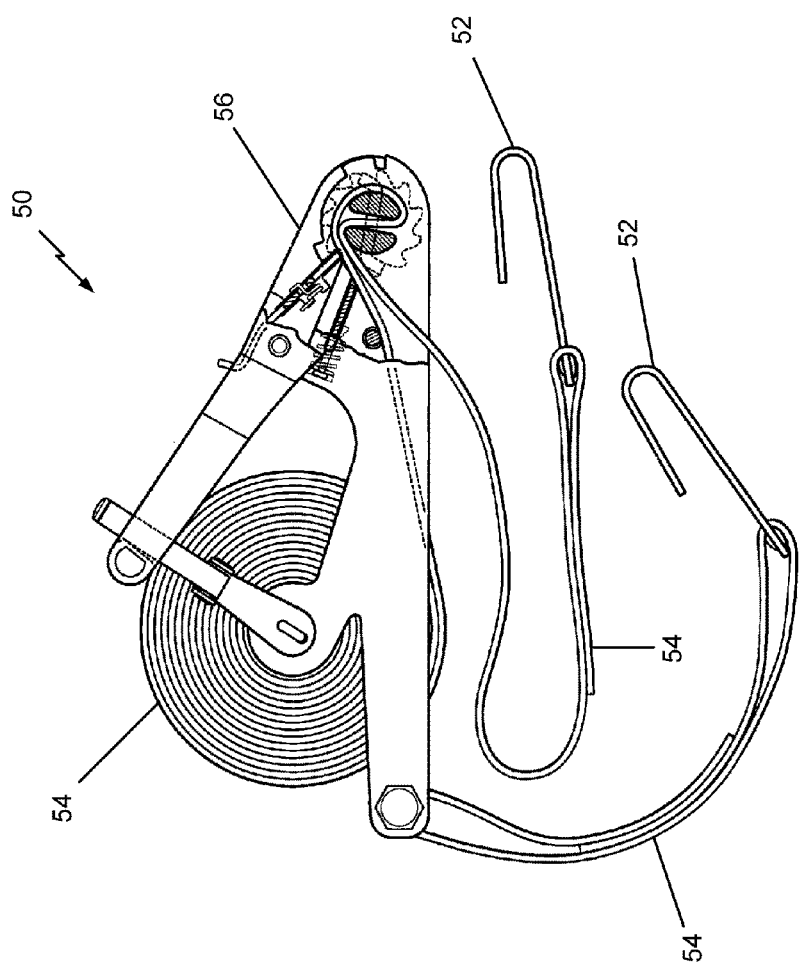
FIG. 3 is a side view illustration of an anchor strap of the tornado protection system, in accordance with the first exemplary embodiment of the present disclosure.

FIG. 3 is a side view illustration of an anchor strap 50 of the tornado protection system 10, in accordance with the first exemplary embodiment of the present disclosure. The anchor strap 50 includes a hook 52 on either side of the strapping material 54. A tensioning device 56, such as a ratchet mechanism, may be positioned between the hooks 52 to allow for tensioning the strapping material 54, as is well known within the art. As is shown in FIG. 3, strapping material 54 may be coiled about a portion of the tensioning device 56 and released therefrom when the anchor strap 50 is released from a tensioned position. Depending on the materials the anchor strap 50 is constructed from and the various sizes of the strapping material 54, the anchor strap 50 shown in FIG. 3 may have a breaking strength from 10,000 to 20,000 pounds, or beyond.

In accordance with FIGS. 1-3, the system 10 may take advantage of the inherent strength of a metal frame or unibody of the vehicle 40 by securing the vehicle 40 to the anchors 30 within the concrete pad 20. Metal frames within vehicles 40, especially trucks and SUV's are able to withstand forces ranging from 20 to 30 thousand pounds, which is substantially higher than the forces most houses can withstand. The vehicle 40 may effectively act as a protecting structure which can guard human beings within the vehicle 40 from flying debris. Securing the vehicle 40 to the concrete pad 20 prevents the vehicle 40 from being moved, rolled, or otherwise dislocated from the tornado forces.

Certain implementations of the system 10 may require securing the vehicle 40 with a plurality of anchors 30 and anchor straps 50 in specific configurations. It may be preferable to utilize four anchor straps 50 which may be connected at one end to tow rings 42 or hooks on the front and rear of the vehicle frame. The opposing ends of the anchor straps 50 may be connected to the anchors 30 secured to the concrete pad 20. The ratchet assemblies may provide a quick and convenient method for tightening the anchor straps 40 so that the total force on the vehicle is distributed uniformly among all of the anchor straps 40.

Figure 4:
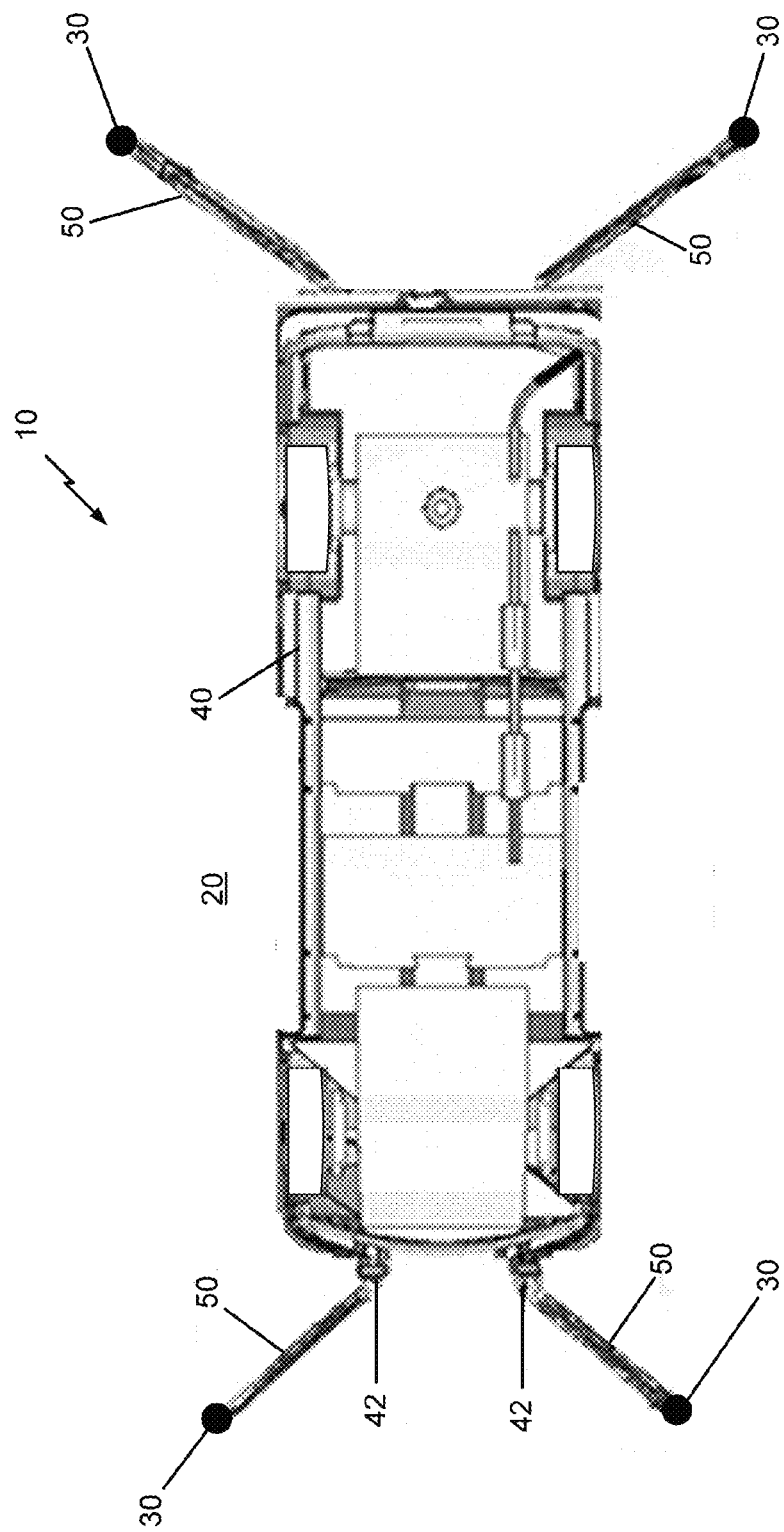
FIG. 4 is a bottom view illustration of the tornado protection system with the anchor straps in a first configuration, in accordance with the first exemplary embodiment of the present disclosure.
Figure 5:
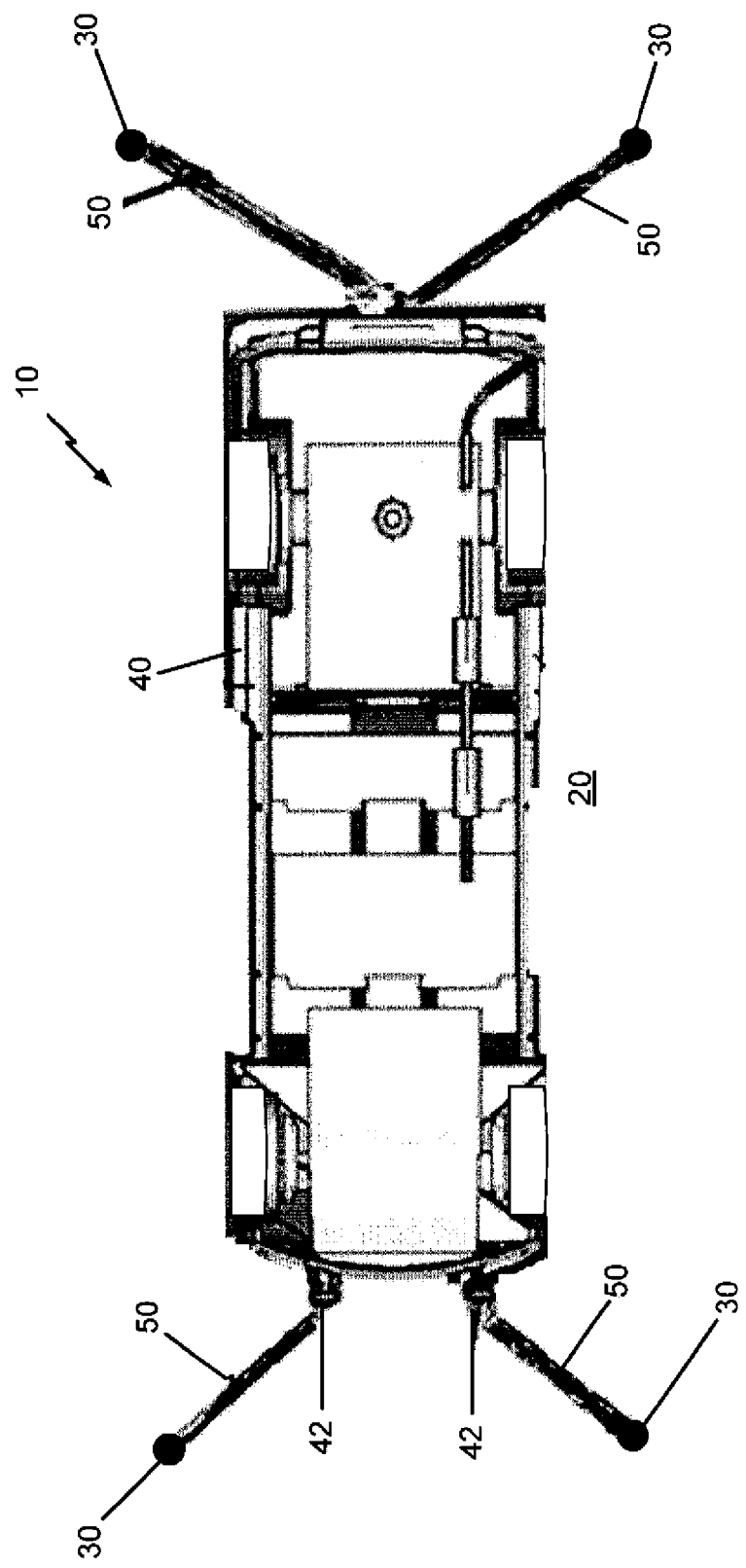
FIG. 5 is a bottom view illustration of the tornado protection system with the anchor straps in a second configuration, in accordance with the first exemplary embodiment of the present disclosure.
Figure 6:
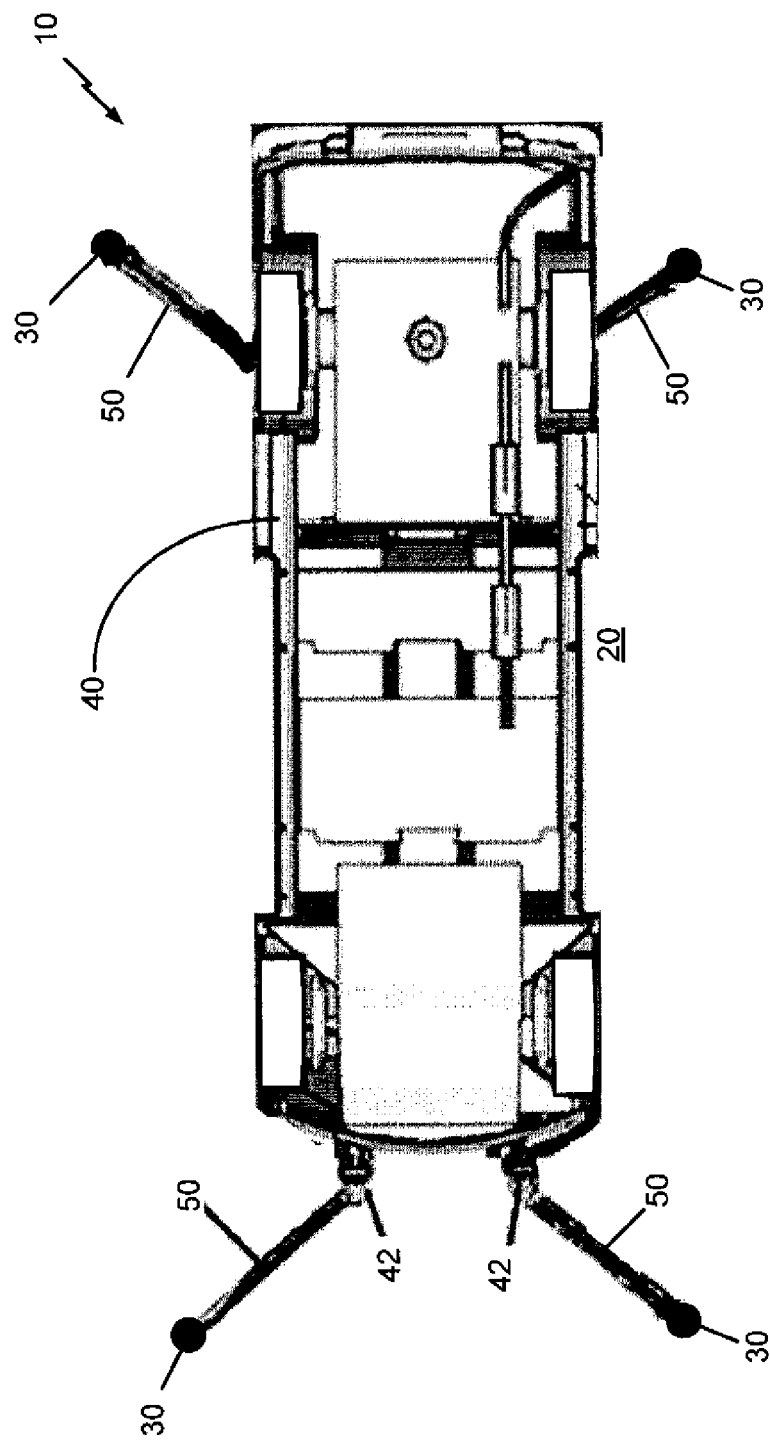
FIG. 6 is a bottom view illustration of the tornado protection system with the anchor straps in a third configuration, in accordance with the first exemplary embodiment of the present disclosure.

FIG. 4 is a bottom view illustration of the tornado protection system 10 with the anchor straps 50 in a first configuration, in accordance with the first exemplary embodiment of the present disclosure. FIG. 5 is a bottom view illustration of the tornado protection system 10 with the anchor straps 50 in a second configuration, in accordance with the first exemplary embodiment of the present disclosure. FIG. 6 is a bottom view illustration of the tornado protection system 10 with the anchor straps 50 in a third configuration, in accordance with the first exemplary embodiment of the present disclosure.

With reference to FIGS. 4-6, each figures illustrates the bottom view of a vehicle 40 frame having a typical body-on-frame construction and a different configuration of how the anchor straps 50 may be connected to the vehicle 40, in particular, the front and rear sections of the frame. In FIG. 4, a first end of each of the four anchor straps 50, i.e., a vehicle end, may be used with two connected to front frame section of the vehicle 40, such as to two tow rings, and two connected to a rear frame section of the vehicle 40. Each anchor strap 50 may be connected to a different point on the vehicle 40, as is shown in FIG. 4, or two or more anchor straps 50 may be connected to the same point along the vehicle 40, as is shown in FIG. 5. For example, in FIG. 5, the front anchor straps 50 secure the vehicle 40 as is shown in FIG. 4, but two rear anchor straps 50 connect to a trailer hitch of the vehicle 40, such as a Class IV or Class V trailer hitch having a tow ring or hook mounted into the trailer hitch.

In both FIGS. 4 and 5, a second end of each of the anchor straps 50, e.g., the anchor end, is each positioned laterally exterior of the vehicle 40, such that the anchor end is connected to an anchor 30 that is located offset from a center of the vehicle 40. Having the anchors 30 positioned offset or laterally exterior of the center of the vehicle 40 may provide enhanced stability with retaining the vehicle 40 in the grounded position even when the vehicle 40 is subjected to horizontal and vertical wind forces of a tornado. In particular, in addition to securing the vehicle 40 in a grounded position, this angled configuration of the anchor strap 50 position may provide enhanced benefits with preventing rolling of the vehicle 40 due to tornado wind forces. While the specific angular configuration of the anchor straps 50 relative to the vehicle 40 may vary, it may be preferable to locate the anchor ends of the anchor straps 50 at positions wider and longer than a width and length of the vehicle 40 itself.

FIG. 6 illustrates the bottom view of a body-on-frame type vehicle 40 and how anchor straps 50 may be connected to the front and rear sections of the vehicle frame. In particular, FIG. 6 shows an implementation where the front anchor straps 50 with ratchet devices connect to the frame, similar to FIGS. 4-5, but the anchor straps 50 with ratchet devices connecting the rear end of the vehicle 40 use tire straps. The tire straps, as will be further described relative to FIG. 7, may connect directly to a tire of the vehicle 40 and not to the frame of the vehicle 40. This implementation may not require any modifications to the vehicle for the rear anchor straps 50, because the rear anchor straps 50 may hold the vehicle 40 in place via anchor straps 50 that are draped on the rear tires.

Figure 7:
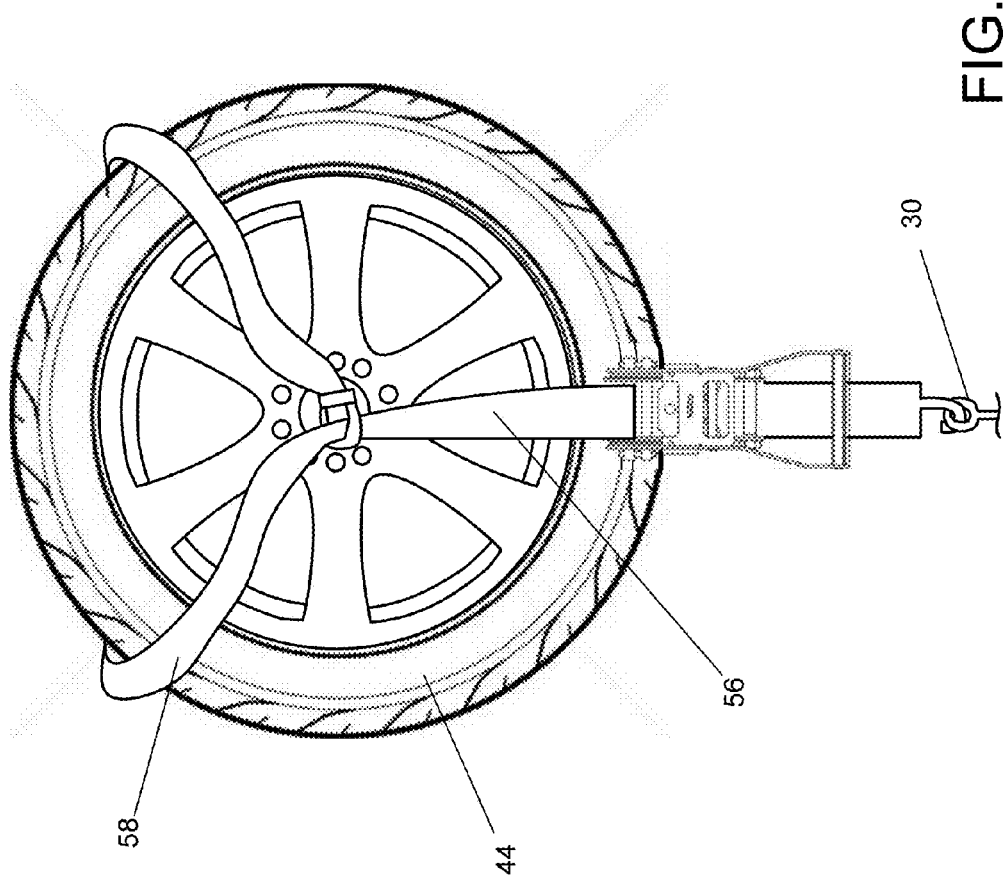
FIG. 7 is a partial side view illustration of the tornado protection system with the anchor straps draped over a vehicle tire, in accordance with the first exemplary embodiment of the present disclosure.

FIG. 7 is a partial side view illustration of the tornado protection system 10 with the anchor straps 50 draped over a vehicle tire 44, in accordance with the first exemplary embodiment of the present disclosure. As if shown in FIG. 7, utilizing an anchor strap 50 directly with a vehicle tire 44 may include a tire strap 58 which is positioned over an upper portion of the vehicle tire 44. The tire strap 58 includes an opening which the top of the vehicle tire 58 may protrude through, thereby allowing the tire strap 58 to be retained in place over the vehicle tire 58. The anchor strap 50 may connect to the tire strap 58 and be secured to an anchor 30 positioned in the concrete pad 30. When the tire strap 58 is used, the anchor 30 may generally be positioned substantially aligned with a center of the vehicle tire 44 and lateral from the side of the vehicle 40. The retaining configurations of the system 10 shown in FIG. 6 may require one anchor strap 50 with associated ratchet for each rear wheel, as shown in FIG. 7. The tire straps 58 draped over the rear wheels in FIG. 7 may require a breaking strength of at least 10,000 pounds each, which can be achieved with polyester straps of 2 inch width.

With reference to FIGS. 4-6, the anchor straps 50 and any connecting hardware, such as the ratchet devices, should have sufficient strength to offset the tornado's vertical and horizontal forces associated with the barometric pressure drop and winds of a tornado. In the case of vertical lift, a tornado pressure change of a nominal 30 millibars below atmospheric in a one second interval creates an upward force of approximately 0.45 pounds per square inch or 64.8 pounds per square foot on the bottom area of the vehicle 40. This upward force is opposed by the force from the anchor straps 50 to prevent the vehicle 40 from lifting, which may be used to calculate the strength requirements for the anchor straps 50 and associated connecting hardware.

Tornado lift is the lift produced by the atmospheric pressure drop inside the tornado. The net lifting force is the result of subtracting the vehicle weight from the tornado's lift force. As an example, the vertical forces on two vehicle 40 types produced by a tornado with a pressure drop of 30 millibars in a one second interval are shown in Table 1, below.

TABLE 1

Typical Lift Forces of a Tornado on Exemplary Vehicles

| Vehicle Type | Weight (lbs.) | Tornado Lift (lbs.) | Net lifting Force (lbs.) | Per Strap Force for 4 straps (lbs.) |
|---|---|---|---|---|
| Ford F150 | 4640 | 8212 | 3572 | 893 |
| Ford F350 | 6730 | 6159 | −571 | −143 |

The system 10 utilizing the anchor straps 50 and anchors 30, plus any associated hardware including the ratchet device and heavy duty anchor hardware, will be required to constrain the vehicle 40 in the vertical dimension for at least an EF-4 tornado or lower. This requirement can be achieved with anchor straps 50 constructed from polyester, rated at a 3,350 pound working level and a breaking strength of 10,000 pounds. The lifting force of the tornado on the vehicle 40 will be distributed among the four anchor straps 50 that are connected to heavy duty anchors 30 that are secured within the concrete pad 20. To provide certain grounding of the vehicle 40 during a tornado, the system 10 may utilize anchor straps 50 that are far greater in their strength ratings than may actually be required. Further, since the system 10 may be available to vehicles 40 having varying weights, the anchor straps 50 should be capable of retaining a vehicle 40 having a weight of at least 4,640 lbs., the average weight of a standard full-size truck.

Anchor straps 50 may connect directly to tow rings 42 on the vehicle frame to avoid connecting via the vehicle's suspension system. When anchor straps 50 are connected via a vehicle's suspension system, a reduction in the system performance may result due to flexing and movement of the suspension system. For situations where it may be difficult to use tow rings 42 on the front or rear of the vehicle 40, other systems may be used. For example, in addition to the tire straps 58 of FIG. 7, other securing nets and strap configurations used having tension devices can be used to tie down the vehicle, with some loss of maximum performance. In this example, it is envisioned that lighter-weight vehicles that lack substantial weight may be secured to the anchors 30 utilizing a strap net that is positioned over the entirety of the vehicle 40.

In addition to the vertical lift component of a tornado, the horizontal wind component is substantial as shown below in Table 2. The horizontal force component from a tornado was computed using an 80 sq ft flat plate model.

TABLE 2

Exemplary Horizontal Tornado Forces

| Tornado Level | Horizontal force (lbs.) | Max. wind speed (MPH) |
|---|---|---|
| EF-0 | 2959 pounds | 85 |
| EF-1 | 4956 pounds | 110 |
| EF-2 | 7465 pounds | 135 |
| EF-3 | 11151 pounds | 165 |
| EF-4 | 16384 pounds | 200 |
| EF-5 | 25600 pounds | 250 |

Additionally, the system 10 may be used with other types of storms that are similar to tornados. For example, a derecho is a widespread, straight-line wind storm that can cause hurricane force winds, tornados, heavy rains, flash floods, and strong winds exceeding 100 MPH. These winds move in a generally linear direction and may be comparable to the horizontal forces produced by tornados.

In the case of the horizontal forces, winds associated with a tornado may push against the vertical area of the vehicle much like wind provides the force on a sail to move a sailboat. Of course, the wind forces are composed of a combination of both vertical and horizontal forces. The resultant vector sum based upon the vertical and horizontal force components can be calculated, as is shown in Table 3, below.

TABLE 3

Exemplary Vector Forces of Tornados

| Tornado Level | Lift force (lbs.) | Horizontal (lbs.) | Vector Force (lbs.) |
|---|---|---|---|
| EF-0 | 3572 | 2959 | 4638 |
| EF-1 | 3572 | 4956 | 6109 |
| EF-2 | 3572 | 7465 | 8276 |
| EF-3 | 3572 | 11151 | 11709 |
| EF-4 | 3572 | 16384 | 16769 |
| EF-5 | 3572 | 25600 | 25848 |

As may be understood from Table 3, it is desirable for the system 10 to retain the vehicle 40 in the grounded position on the concrete pad 30 using the anchor straps 50 and the anchors 30 throughout the duration of the tornado that has horizontal forces of at least 2,959 lbs. and a vector force of at least 4,638 lbs.

By distributing the maximum vector force levels shown in Table 3 among the preferable system 10 configuration utilizing two-to-four anchor straps 50, the tornado induced loads on each of the anchor straps 50 are provided in Table 4, as follows:

TABLE 4

Exemplary Force (Pounds per Strap) on Anchor Straps

| Tornado Level | 4 Straps | 3 Straps | 2 Straps |
|---|---|---|---|
| EF-0 | 1160 | 1546 | 2319 |
| EF-1 | 1527 | 2758 | 3054 |
| EF-2 | 2069 | 2759 | 4138 |
| EF-3 | 2927 | 3903 | 5855 |
| EF-4 | 4192 | 5590 | 8384 |
| EF-5 | 6462 | 8616 | 12924 |

Utilizing Table 4, it can be concluded that a breaking strength of 10,000 pounds for 2 inch wide anchor straps 50 and associated hardware will sufficiently retain a vehicle securely in a grounded position throughout the duration of a tornado having a rating of up to EF-4 for all of the configurations presented in FIGS. 4-6. A tornado rating of EF-5 is the maximum level, having wind speeds of above 200 MPG, sometimes as high as 250 MPH, according to FEMA P-320. Protection against an EF-5 level of 250 miles per hour maximum wind speed may require a 3 inch wide strap and associated hardware having a breaking strength of 15,000 pounds, since there are situations where the system 10 may be used with only two anchor straps 50, thereby providing less ability to distribute forces of the tornado.

With the configuration of FIG. 6 where, for example, two-inch polyester anchor straps 50 are connected to tow rings 42 or hooks on the front of the frame and anchor straps 50 having tire straps 58 (FIG. 7) are used with the rear wheels, the leaf spring capacity for a vehicle may limit the system 10 capability. For example, for a Ford F-350 truck the system 10 may be limited to a capability of approximately 7,000 pounds. Thus, a Ford F-350 with heavy duty leaf springs may provide sufficient capability of resisting tornado forces at levels up to an EF-4, but may have complications for EF-5 tornados. Smaller vehicles using lower rated leaf springs may be limited to a capability of 2,000 pounds or less, which may make utilizing the tire strap 58 configuration less appropriate in tornado levels of EF-4 and lower.

Figure 9:
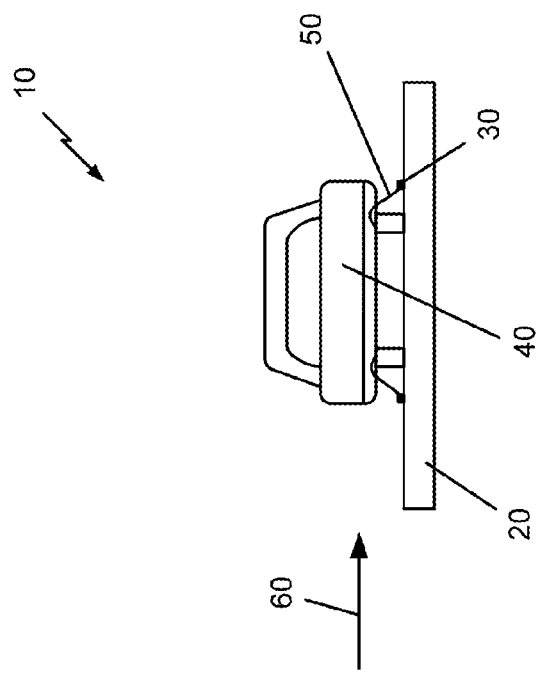
FIG. 9 is a schematic illustration of the tornado protection system in use without a garage, in accordance with the first exemplary embodiment of the present disclosure.
Figure 8:
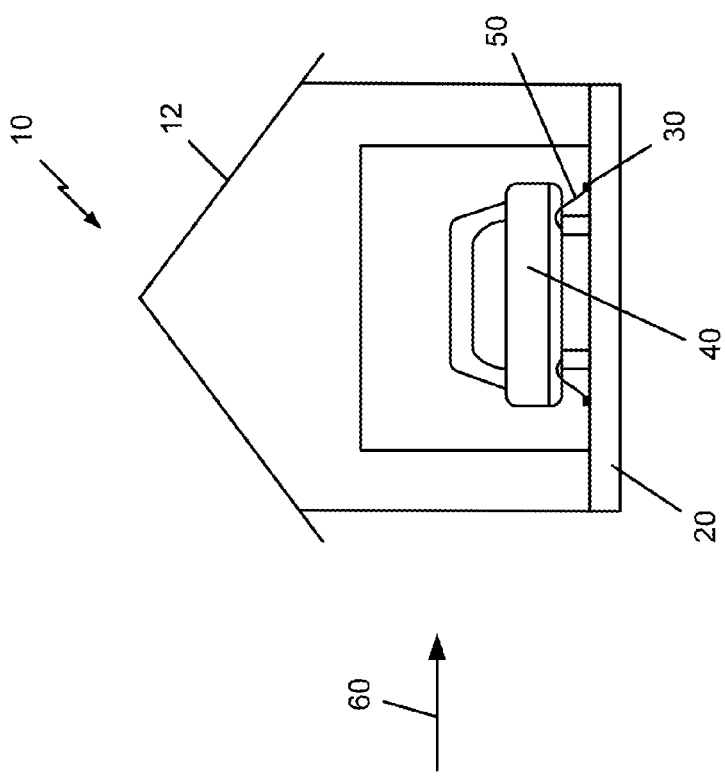
FIG. 8 is a schematic illustration of the tornado protection system in use with a garage, in accordance with the first exemplary embodiment of the present disclosure.

FIG. 8 is a schematic illustration of the tornado protection system 10 in use with a garage 12, in accordance with the first exemplary embodiment of the present disclosure. FIG. 9 is a schematic illustration of the tornado protection system 10 in use without a garage, in accordance with the first exemplary embodiment of the present disclosure. Relative to FIGS. 8-9, it may be preferable for the system 10 to be utilized within a structure, such as a garage 12 or a barn, so long as the structure has the necessary concrete pad 30 required by the system 10. In FIG. 8, the wind forces 60 of the tornado (shown as a horizontal force but also including vertical forces), may apply a significant force on the side of the garage 12. When this situation occurs, the tornado forces 60 may be partially blocked by the walls of the garage 12, thereby resulting in a partial tornado force being applied to the vehicle 40 within the garage 12. In contrast, when there is no garage 12, as is shown in FIG. 9, the full tornado force 60 will be applied directly to the vehicle 40.

While the presence of the vehicle 40 within the garage 12 may have a lesser impact once the garage 12 has succumbed to the forces of the tornado and is destroyed, prior to that occurrence, the garage 12 acts as a preliminary shield to the vehicle 40. In particular, the garage 12 may help block articles that the tornado forces 60 are moving through the air, such as debris. When the vehicle 40 is not positioned within the garage 12, the vehicle 40 may be bombarded with tornado debris, which may cause injury to inhabitants of the vehicle 40. Thus, while the system 10 may be employed without a garage 12 or similar structure, it is preferable to utilize the system 10 within a garage 12 to limit exposure to tornado debris.

Additionally, sheltering a human being or other living being within the vehicle 40 during the duration of the tornado and retaining the vehicle 40 in a grounded position on the concrete pad 20, various safety features of the vehicle 40 may be utilized to provide further protection to the users of the system. For example, the safety glass of the vehicle's 40 windshield and other windows may protect passengers from flying debris, or from the glass itself, if it fails during a tornado. Also, the use of seatbelts to secure uses within the vehicle 40, the use of the vehicle's airbags to minimize injuries if the vehicle 40 is suddenly moved by the tornado, and wearing protective headgear such as a helmet may all be utilized to gain enhanced protection from a tornado. In particular, the ignition of the vehicle 40 should be turned to the position where the airbag system of the vehicle 40 is in a deployable state, such that the airbags are capable of being deployed.

Figure 10:
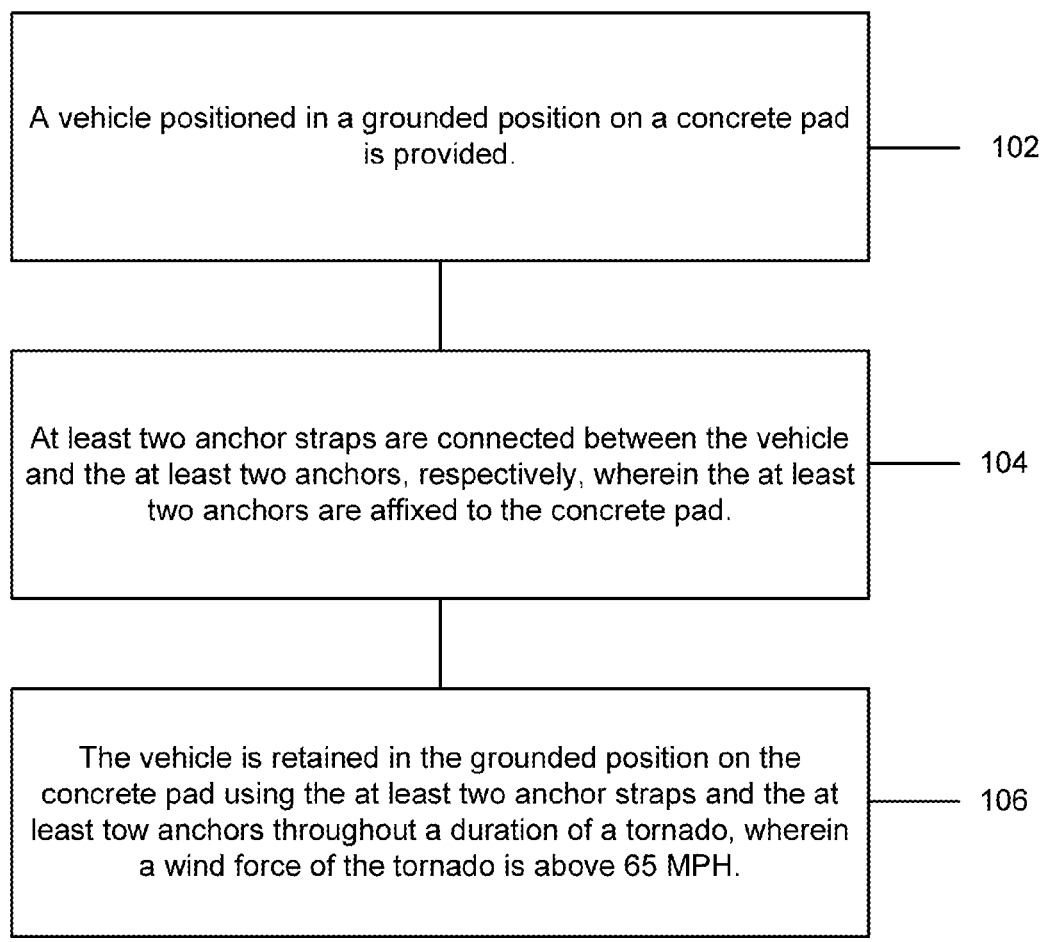
FIG. 10 is a flowchart illustrating a method of anchoring a vehicular shelter during a tornado, in accordance with the first exemplary embodiment of the disclosure.

FIG. 10 is a flowchart 100 illustrating a method of anchoring a vehicular shelter during a tornado, in accordance with the first exemplary embodiment of the disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a vehicle positioned in a grounded position on a concrete pad is provided. At least two anchor straps are connected between at least two sides of the vehicle and the at least two anchors, respectively, wherein the at least two anchors are affixed to the concrete pad (block 104). The vehicle is retained in the grounded position on the concrete pad using the at least two anchor straps and the at least two anchors throughout a duration of a tornado, wherein a wind force of the tornado is above 65 MPH (block 106).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:
1. A tornado protection system comprising:
    a concrete pad;
    at least two anchors affixed to the concrete pad;
    a vehicle having a weight of at least 4,640 pounds positioned in a grounded position on the concrete pad; and at least two anchor straps constructed from a woven fabric material and each having a breaking strength of at least 10,000 pounds, wherein the at least two anchor straps are connected between the vehicle and the at least two anchors, respectively, wherein the at least two anchor straps anchor straps are connected to at least two sides of the vehicle, respectively, wherein the at least two anchors and the at least two anchor straps retain the vehicle in a grounded position on the concrete pad with tires of the vehicle in contact with the concrete pad, wherein each of the at least two anchors has an anchor post extending into a hole within the concrete pad and a wedge extending radially from the anchor post, wherein the wedge is embedded into a sidewall of the hole within the concrete pad.

2. The tornado protection system of claim 1, wherein the vehicle further comprises at least one of: a truck, a sport-utility vehicle (SUV), a body-on-frame construction, and a unibody construction vehicle.

3. The tornado protection system of claim 1, wherein the at least two anchor straps are connected between the at least two anchors and a frame of the vehicle.

4. The tornado protection system of claim 3, wherein the at least two anchor straps are connected between the at least two anchors and at least two tow rings of the frame of the vehicle.

5. The tornado protection system of claim 1, wherein each of the at least two anchor straps has a tensioning device, wherein the tensioning devices facilitates tensioning of the at least two anchor straps.

6. The tornado protection system of claim 1, wherein the at least two anchor straps further comprise at least four anchor straps and wherein the at least two anchors further comprises at least four anchors, wherein two of the at least four anchor straps are connected between a front of the vehicle and two of the at least four anchors, and wherein two of the at least four anchor straps are connected between a rear of the vehicle and two of the at least four anchors.

7. The tornado protection system of claim 6, wherein each of the at least four anchor straps has a vehicle end and an anchor end, wherein the anchor end of each of the at least four anchor straps is positioned laterally exterior of the vehicle end of each of the at least four anchor straps.

8. The tornado protection system of claim 1, wherein the woven fabric material of the at least two anchor straps is flexible and non-stretchable.

9. A tornado protection system comprising:
a concrete pad;
at least two anchors affixed to the concrete pad;
a vehicle having a weight of at least 4,640 pounds positioned in a grounded position on the concrete pad; and
at least two anchor straps constructed from a woven fabric material and each having a breaking strength of at least 10,000 pounds, wherein the at least two anchor straps are connected between the vehicle and the at least two anchors, respectively, wherein the at least two anchor straps anchor straps are connected to at least two sides of the vehicle, respectively, wherein the at least two anchors and the at least two anchor straps retain the vehicle in a grounded position on the concrete pad with tires of the vehicle in contact with the concrete pad, wherein each of the at least two anchors has an anchor post extending into a hole within the concrete pad and a wedge extending radially from the anchor post, wherein the wedge is embedded into a sidewall of the hole within the concrete pad, and wherein each of the at least two anchors further comprises an anchor fixture removably connectable to the anchor post, wherein the anchor fixture connected to the anchor post is secured in a non-movable position to the concrete pad.

10. The tornado protection system of claim 1, wherein the concrete pad has a weight of at least 10,000 pounds.

11. The tornado protection system of claim 6, wherein the front of the vehicle and the rear of the vehicle further comprise a front frame rail of the vehicle and a rear frame rail of the vehicle, respectively.

12. The tornado protection system of claim 7, wherein the vehicle ends of at least two of the at least four anchor straps are connected to a single point on the vehicle.

* * * * *

UNITED STATES PATENT AND TRADEMARK OFFICE
CERTIFICATE OF CORRECTION

Page 1 of 1

PATENT NO. : 9,127,704 B2
APPLICATION NO. : 14/340019
DATED : September 8, 2015
INVENTOR(S) : Rolf Hubert et al.

It is certified that error appears in the above-identified patent and that said Letters Patent is hereby corrected as shown below:

IN THE CLAIMS

Col. 11, Claim 1, Line 5, delete "anchor straps" (second occurrence).

Col. 12, Claim 9, Line 15, delete "anchor straps" (second occurrence).

Signed and Sealed this
Twenty-sixth Day of January, 2016

Michelle K. Lee
*Director of the United States Patent and Trademark Office*